US008320939B1

(12) United States Patent
Vincent

(10) Patent No.: US 8,320,939 B1
(45) Date of Patent: Nov. 27, 2012

(54) CROWD-SOURCED INFORMATION FOR INTERIOR LOCALIZATION AND NAVIGATION

(75) Inventor: Luc Vincent, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 35 days.

(21) Appl. No.: 13/091,504

(22) Filed: Apr. 21, 2011

(51) Int. Cl.
*H04W 24/00* (2009.01)
(52) U.S. Cl. .................. 455/456.1; 455/415; 709/224; 370/338
(58) Field of Classification Search ............. 455/456.1, 455/415, 440, 404.2; 709/224; 340/572.1; 370/338
See application file for complete search history.

(56) References Cited

U.S. PATENT DOCUMENTS

2008/0293431 A1* 11/2008 Buerger et al. ............ 455/456.1
2011/0320583 A1* 12/2011 Parker et al. .................. 709/224

OTHER PUBLICATIONS

Manh Hung V. Le, Dimitris Saragas, Nathan Webb, Indoor Navigation System for Handheld Devices, Oct. 22, 2009, 133 pages.
Paulo Pombinho, Ana Paula Afonso, and Maria Beatriz Carmo, Indoor Positioning Using a Mobile Phone With an Integrated Accelerometer and Digital Compass, 4 pages, Sep. 9-10, 2010.
Yiguang Xuan, Raja Sengupta, and Yaser Fallah, Crowd Sourcing Indoor Maps With Mobile Sensors, 2010, 12 pages.

* cited by examiner

*Primary Examiner* — Phuoc Doan
(74) *Attorney, Agent, or Firm* — Lerner, David, Littenberg, Krumholz & Mentlik, LLP

(57) ABSTRACT

Aspects of the disclosure relate generally to using crowd sourced information to generate walkable paths through indoor spaces. More specifically, aspects relate to recording data such as accelerometer readings, wireless network or other beacon signal information, and timestamps while a client device moves within an indoor space. If the user reaches a destination within the indoor space, the client device may prompt the user for information about the destination. The information received and recorded by the client device may be sent to a server computer for further processing. The server may use the information to identify walkable paths within the indoor space. This information in turn may be used in various ways, such as to provide navigation assistance to users though the indoor space.

21 Claims, 10 Drawing Sheets

CROWD-SOURCED INFORMATION FOR INTERIOR LOCALIZATION AND NAVIGATION

BACKGROUND

Modern Smartphone devices are equipped with GPS features. These devices uses signals from GPS satellites to identify a location, determine a direction of motion, and other navigation functions. However, in locations where the GPS satellite signals are weak, for example, when these devices are indoors, GPS may not function well or at all.

As an alternative, these devices may use other information, such as WiFi signals, Bluetooth, compass and accelerometers as well as existing floor plans and pre-generated databases or indexes of measurements. However, creating such databases and indexes may be slow and tedious. For example, in order to enable localization in a particular building, the process may necessitate several steps, including generating a route map or walkable path of the building based on a floor plan; generating an index of all useable POIs (conference rooms, bathrooms, offices, etc.) and their coordinates; and surveying signals (Bluetooth, WiFi, beacons, etc.) and their strengths throughout the building. This again may be a very costly and time consuming process.

SUMMARY

Aspects of the present disclosure relate generally to using crowd sourced information to generate walkable paths through indoor spaces. More specifically, aspects relate to recording data such as accelerometer readings, wireless network access location or other beacon signal information, and timestamps while a client device moves within an indoor space. This recording may be conducted after a user has actively provided his or her consent to participate. If the user reaches a destination within the indoor space, the client device may prompt the user for information about the destination. The information received and recorded by the client device may be sent to a server computer for further processing. The server may use the information to identify walkable paths within the indoor space. This information in turn may be used in various ways, such as to provide navigation assistance to users though the indoor space.

One aspect of the disclosure provides a method. The method includes determining, by a processor, that a GPS signal is insufficient to accurately determine position based on a characteristic of the GPS signal; identifying an entrance location of a building based on a GPS coordinate identified before determining that the GPS signal is insufficient; after the GPS signal is determined to be insufficient, recording a set of route data including a timestamp, accelerometer data, and a wireless network signal fingerprint comprising one or more wireless network signal beacon identifiers and associated signal strengths; identifying an exit location of the building based on a GPS coordinate determined after the processor is able to accurately determine position based on GPS signals; storing the entrance location, the exit location, and the route data in memory accessible by the client device; generating, by the processor, a track including a set of location coordinates based on the route data, the entrance location, and the exit location; and transmitting the track to a server.

In one example, the method also includes determining when the client device has stopped moving based on the accelerometer data; when the client device has stopped, presenting to a user a request for information regarding a current location of the client device; receiving information identifying the current location of the client device; and storing the received information as a destination. In another example, the method also includes identifying location coordinates associated with the destination based on the entrance location, exit location, and route data; and transmitting the location coordinates associated with the destination and the destination to the server. In yet another example, the method also includes identifying a particular building associated with the entrance location and the exit location based on a map of building footprint data; associating the particular building with the route; and transmitting the particular building associated with the route to the server. In still another example, the signal beacon identifiers include wireless network access point identifiers.

Another aspect of the disclosure provides a method. The method includes identifying a plurality of tracks, each track including (a) an entrance location of a particular building based on a last set of GPS signals determined by a given client device before the given client device determines that a GPS signal is insufficient to accurately determine position based on a characteristic of the GPS signal, (b) a set of intermediate locations, each intermediate location being associated with an estimated geolocation coordinate a wireless network signal fingerprint comprising wireless network signal beacon identifiers and associated signal strengths, the set of intermediate locations being recorded after the GPS signal has been determined to be insufficient, (c) destination data including information about the destination received from a user, a destination wireless network signal fingerprint, and an estimated geolocation coordinate for the destination, and (d) an exit location of the particular building determined based on GPS signals received by the client device after the client device is able to accurately determine position based on the received GPS signals; selecting a subset of the plurality of tracks having a common entrance location and a common estimated geolocation coordinate for a particular destination associated with an interior of the particular building; refining the subset of tracks based on the wireless network signal fingerprints associated with the set of intermediate locations associated with each track of the subset of tracks; and identifying one or more walkable paths through the particular building based on the refined subset of tracks.

In one example, the method also includes receiving, from a particular client device, a request for directions to the particular destination; generating a set of instructions for navigating to the destination based on the identified one or more walkable paths; and transmitting the set of instructions to the particular client device. In another example, the refining based on clustering the tracks of the subset of tracks. In yet another example, the method also includes receiving the plurality of tracks from a plurality of client devices. In a further example, the method also includes receiving, from a plurality of client devices, a received plurality of routes including (a) an entrance location of the particular building based on the last GPS signals determined by a given one of the plurality of client device before the given client device determines that a GPS signal is insufficient to accurately determine position based on a characteristic of the GPS signal, (b) a received set of intermediate locations, each intermediate location being associated with accelerometer data, a wireless network signal fingerprint, and a time stamp, (c) received destination data including the information about the destination received from a user, a destination wireless network signal fingerprint, and a timestamp, and (d) an exit location of the particular building determined based on GPS signals received by the given client device after the given client device is able to accurately determine position based on the received GPS signals; and generating, by the processor, the estimated geolocation coordinates for each of the intermediate locations and the estimated geolocation coordinate for the destination, based on the received plurality of routes; and wherein the plurality of tracks are identified based on the received plurality of routes, the estimated geolocation coordinates for each of the intermediate locations and the estimated geolocation coordinate for the destination. In still another example, the method also includes selecting a particular walkable path of the one or more identified walkable paths based on the number of the subset of tracks which correspond to the particular walkable path; storing the particular walkable path; receiving, from a particular client device, a request for directions to the particular destination; generating a set of instructions for navigating to the destination based on the particular walkable paths; and transmitting the set of instructions to the particular client device. In a further example, the signal beacon identifiers include wireless network access point identifiers.

Yet another aspect of the invention provides a device. The device includes memory and a processor. The processor determines that a GPS signal is insufficient to accurately determine position based on a characteristic of the GPS signal; identifies an entrance location of a building based on a GPS coordinate identified before determining that the GPS signal is insufficient; after the GPS signal is determined to be insufficient, records a set of route data including a timestamp, accelerometer data, and a wireless network signal fingerprint comprising one or more wireless network signal beacon identifiers and associated signal strengths; identifies an exit location of the building based on a GPS coordinate determined after the processor is able to accurately determine position based on GPS signals; stores the entrance location, the exit location, and the route data in the memory; generates a track including a set of location coordinates based on the route data, the entrance location, and the exit location; and transmit the track to a server.

In one example, the processor also determines when the client device has stopped moving based on the accelerometer data; when the client device has stopped, presents to a user a request for information regarding a current location of the client device; receives information identifying the current location of the client device; and stores the received information as a destination. In another example, the processor also identifies location coordinates associated with the destination based on the entrance location, exit location, and route data; and transmits the location coordinates associated with the destination and the destination to the server. In yet another example, the processor also identifies a particular building associated with the entrance location and the exit location based on a map of building footprint data; associates the particular building with the route; and transmits the particular building associated with the route to the server.

Still another aspect of the invention provides a device. The device includes memory and a processor. The processor identifies a plurality of tracks, each track including (a) an entrance location of a particular building based on a last set of GPS signals determined by a given client device before the given client device determines that a GPS signal is insufficient to accurately determine position based on a characteristic of the GPS signal, (b) a set of intermediate locations, each intermediate location being associated with an estimated geolocation coordinate a wireless network signal fingerprint comprising wireless network signal beacon identifiers and associated signal strengths, the set of intermediate locations being recorded after the GPS signal has been determined to be insufficient, (c) destination data including information about the destination received from a user, a destination wireless network signal fingerprint, and an estimated geolocation coordinate for the destination, and (d) an exit location of the particular building determined based on GPS signals received by the client device after the client device is able to accurately determine position based on the received GPS signals; selects a subset of the plurality of tracks having a common entrance location and a common estimated geolocation coordinate for a particular destination associated with an interior of the particular building; refines the subset of tracks based on the wireless network signal fingerprints associated with the set of intermediate locations associated with each track of the subset of tracks; identifies one or more walkable paths through the particular building based on the refined subset of tracks; and stores the one or more walkable paths in the memory.

In one example, the processor also receives, from a particular client device, a request for directions to the particular destination; generates a set of instructions for navigating to the destination based on the identified one or more walkable paths; and transmits the set of instructions to the particular client device. In another example, the processor refines by clustering the tracks of the subset of tracks. In yet another example, the processor also receives the plurality of tracks from a plurality of client devices. In still a further example, the processor also selects a particular walkable path of the one or more identified walkable paths based on the number of the subset of tracks which correspond to the particular walkable path; stores the particular walkable path in the memory; receives, from a particular client device, a request for directions to the particular destination; generates a set of instructions for navigating to the destination based on the particular walkable paths; and transmits the set of instructions to the particular client device.

DETAILED DESCRIPTION

Figure 1:
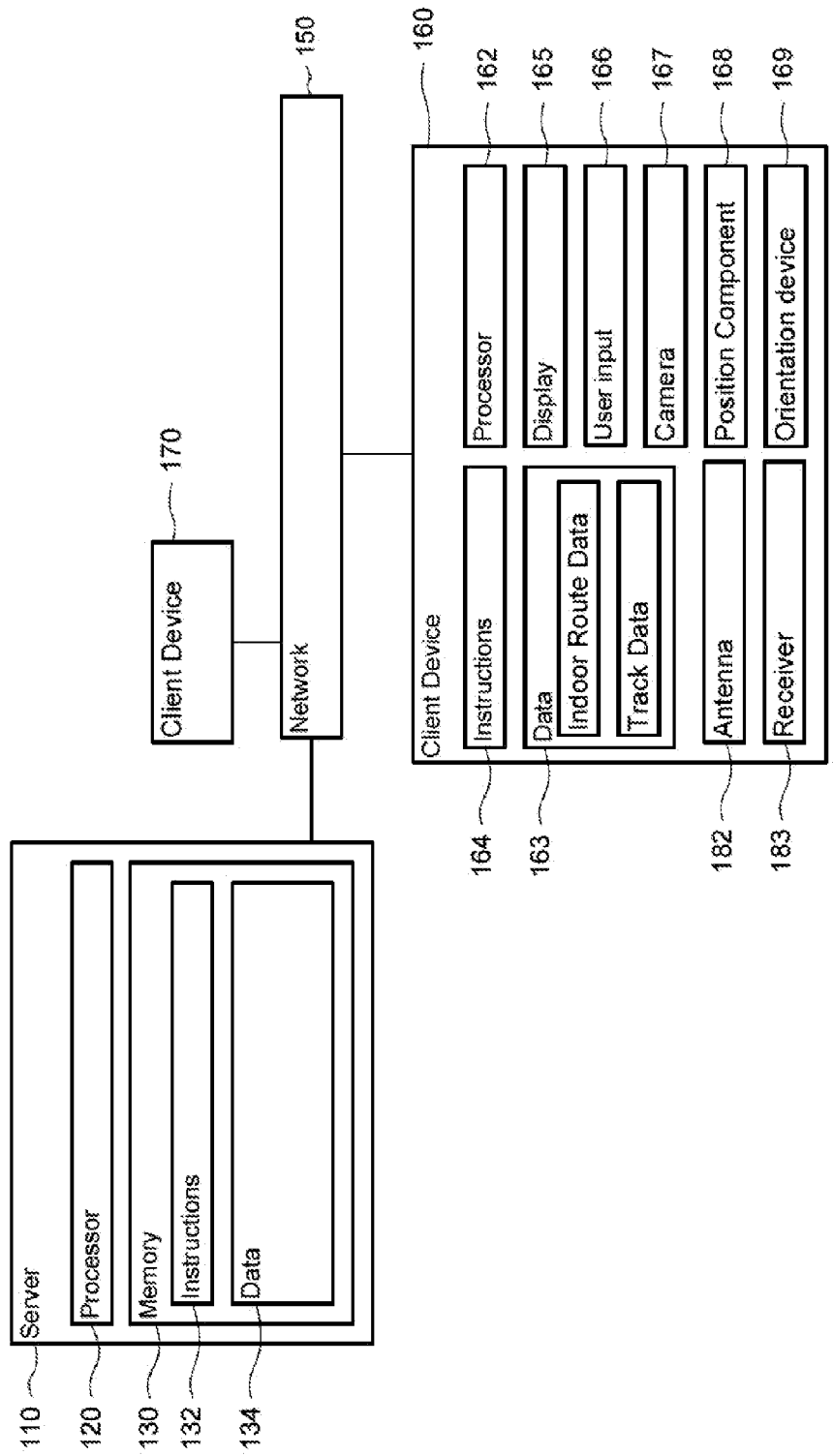
FIG. 1 is a functional diagram of a system in accordance with an exemplary embodiment.

A location-enabled client device that is outside, for example not within a building or other structure, may be configured to receive GPS signals. If the client device moves indoors, usually the client will receive only a few, very weak signals or no longer receive any GPS signals at all. If the client device no longer receives strong enough signals from the minimum number of GPS satellites in order to calculate a geographic location, the client device may not be able to use GPS to identify its current location. For example, in order to calculate a geographic location, signals from at least 3 satellites may be required. The client device may then calculate an entrance coordinate based on the last received GPS signals and store the entrance coordinate in memory.

Once indoors, the client device may record log data including accelerometer measurements, wireless network fingerprints, and timestamps as the client device is being moved through the building. The recorded fingerprints need only include enough information to identify a wireless network access location and associated signal strengths.

If the client device determines, for example based on the accelerometer information, that the client device is no longer moving, the client device may determine that the user has reached a destination within the building. In response, the client device may prompt the user for information about the destination. For example, the client device may request that the user identify the destination. The client device may receive information from the user about the destination. The client device also scans for wireless network information. The information received from the user, the wireless network information, and a new timestamp are also stored in memory.

When the client device begins moving through the building again, for example based on the accelerometer information, the client device may determine that it is no longer at the destination. The client device may then continue to record the log data until the client device determines it has reached another destination, prompt the user for information, and record any received information with the results of a wireless network scan and a timestamp as described above.

This process may continue until the user exits the building. Once the user exits a building, the client device may detect new GPS location coordinates as GPS signals are received again. Again, the client device may record the new GPS location coordinates as an exit location.

Next, the client device may calculate a track based on the log data (e.g. timestamps, wireless network fingerprints, and accelerometer measurements), an entrance coordinate, and an exit coordinate. The tracks may include estimated GPS coordinates for each of the locations of the log data, wireless network fingerprints, and timestamps. The client device may transmit the track to a server.

The server may receive tracks from a plurality of client devices. This crowed-sourced information may then be used by the server to identify walkable paths within the indoor space. For example, the server may select tracks with a common entrance or exit coordinate and a common destination within the building. The server may refine the selected tracks based on the wireless network fingerprints associated with the tracks, for example, by identifying the same coordinates between different tracks based on common wireless network fingerprints. The server may then cluster the refined tracks together, se described below, to identify one or more walkable paths between the common coordinate and the destination within the building.

Figure 2:
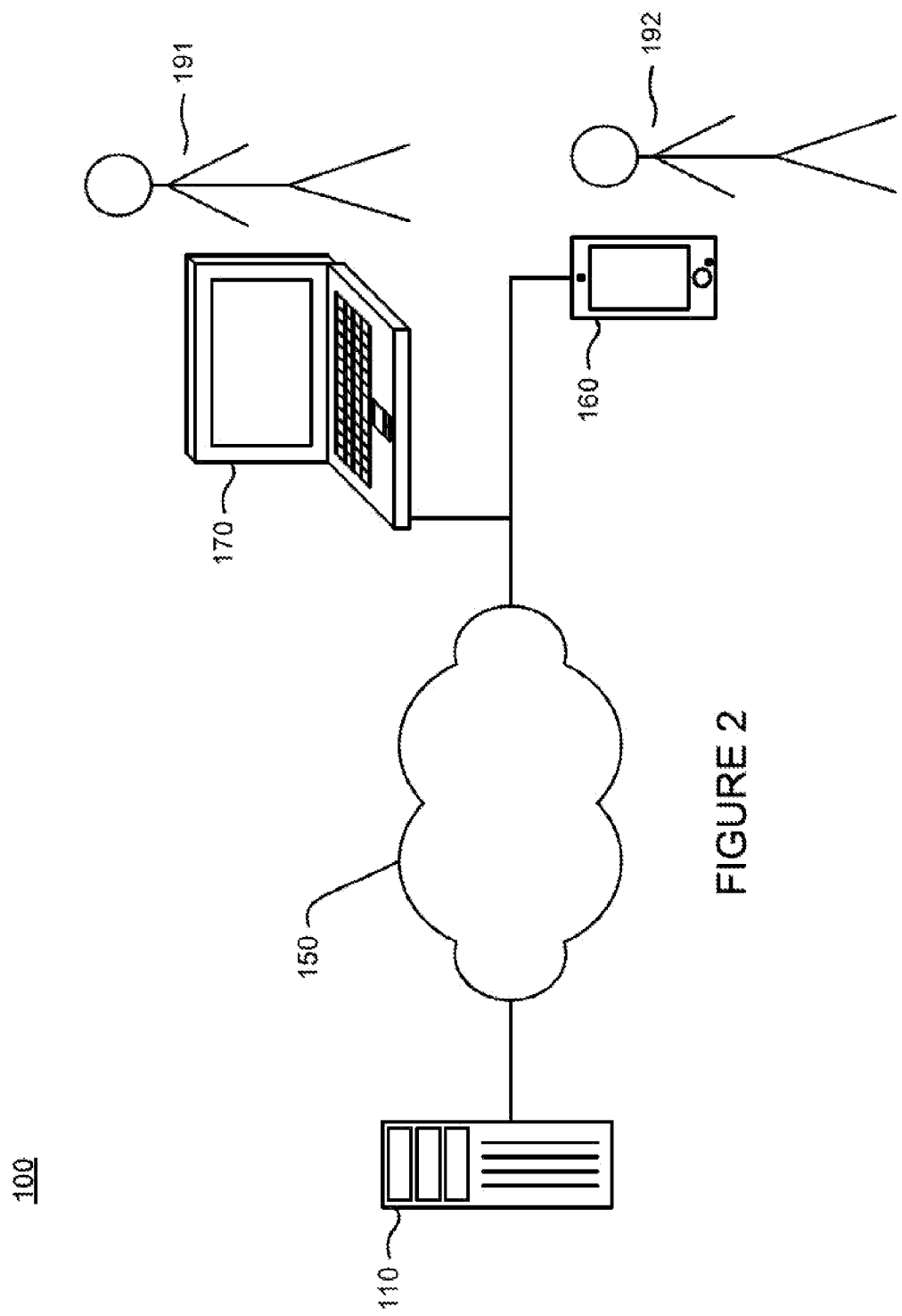
FIG. 2 is a pictorial diagram of the system of FIG. 1.

As shown in FIGS. 1-2, a system 100 for use with an exemplary embodiment includes a computer 110 containing a processor 120, memory 130 and other components typically present in general purpose computers.

The memory 130 stores information accessible by processor 120, including instructions 132, and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor or computer will be understood to include references to a collection of processors or computers or memories that may or may not operate in parallel.

The computer 110 may be at one node of a network 150 and capable of directly and indirectly communicating with other nodes of the network. For example, computer 110 may comprise a web server that is capable of communicating with client devices 160 and 170 via network 150 such that server 110 uses network 150 to transmit and display information to a user on display 165 of client device 170. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

Network 150, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device may be configured similarly to the server 110, with a processor, memory and instructions as described above. Each client device 160 or 170 may be a personal computer intended for use by a person 191-192, and have all of the components normally used in connection with a personal computer such as a central processing unit (CPU) 162, memory (e.g., RAM and internal hard drives) storing data 163 and instructions 164, an electronic display 165 (e.g., a monitor having a screen, a touch-screen, a projector, a television, a computer printer or other device that is operable to display information), end user input 166 (e.g., a mouse, keyboard, touch-screen or microphone). The client device may also include a camera 167, geographic position component 168, speakers, a network interface device, and all of the components used for connecting these elements to one another.

Although the client devices 160 and 170 may each comprise a full-sized personal computer, they may alternatively comprise mobile devices capable of wirelessly exchanging data with a server over a network such as the Internet. By way of example only, client device 160 may be a wireless-enabled PDA, a cellular phone, a tablet PC, or a netbook capable of obtaining information via the Internet. The user may input information using a small keyboard (in the case of a Blackberry-type phone), a keypad (in the case of a typical cellular phone) or a touch screen (in the case of a PDA).

The client devices may include an antenna 182 and receiver 183 which may be used to scan the wireless network spectrum and identify local wireless network signals. For example, the antenna may receive "beacon" messages and send them to the receiver which demodulates the information to identify wireless network access points. In one example, these beacon messages may be IEEE 802.11 management frames transmitted by access points to announce themselves to potential wireless network users. These frames may contain Service Set Identifiers ("SSID") information as well as physical layer parameters that assist devices in connecting to the wireless network. The beacon messages may also include additional network access information which also assists devices in accessing the network, including whether the access point is accepting new users, whether the data is encrypted, and which type of authentication is being used, for example, no authentication (open to all), password based, web-portable based, or Media Access Control ("MAC") address based. However, it will be understood that data collected in accordance with this disclosure may be limited to the information discussed above, for example MAC addresses, SSIDs or other identifiers and signal strengths, and need not contain additional information. For example, information contained in the network traffic or payload data, such as personal information, need not be collected, and in fact, may actually be removed in order to protect the privacy of the wireless network's users.

The geographic position component 168 may comprise a GPS receiver to determine the device's latitude, longitude and/or altitude position. The geographic position component may also comprise software for determining the position of the device based on other signals received at the client device 160, such as an IP address or signals received at a cell phone's antenna from one or more base stations if the client device is a cell phone.

The client devices may also include an orientation device 169, for example an accelerometer, gyroscope, compass and orientation-related software to determine the direction in which the device is oriented. By way of example only, the device may determine its pitch, yaw or roll (or changes thereto) relative to the direction of gravity or a plane perpendicular thereto. In that regard, it will be understood that a client device's provision of orientation data as set forth herein may be provided automatically to the client device. In some examples, the accelerometer, gyroscope and/or compass devices may be used as a pedometer to track a client device's movements (for example, the number of steps by a user when the client device is in a user's hand or pocket, etc.).

Instructions 164 may also include data collection software for collecting the information identified during the scanning and transmit the information to a server. The data collection software may include applications or "widgets" available for a wide variety of mobile phones. For portable computers, data collection functionality may be included in toolbars and other such browser add-ons which may be used with a variety of browser programs. Data may also be collected by devices equipped with wireless network scanning gear and a receiver which monitors a wireless network frequency spectrum. For example, many wireless network access points may operate in the 2.4 GHz frequency band and the signals may be based on 802.11, 802.11b, g, n, or other such standards.

Data 163 may include indoor route data. As described in more detail below, the indoor route data may include entrance coordinates, exit coordinates, as well as wireless network and accelerometer measurements collected by the client device while moving along a route within a building. In addition, the indoor route data may also include destination information provided by a user describing one or more destinations within a building.

The client device may also store "track" data determined from the indoor route data. As described in more detail below, the track data may include set of estimated GPS coordinates along the route taken by the client device between the entrance and exit points of the indoor route data.

In addition to the operations described above and illustrated in the figures, various operations will now be described. It should also be understood that the following operations do not have to be performed in the precise order described below. Rather, various steps can be handled in a different order or simultaneously, and steps may be omitted or added.

As a user holds a client device equipped with features such as GPS and an accelerometer, the client device may detect when the user is moving into a building. For example, when a GPS signal is being received, the client device may determine that the client device (and the user) is outside. When an accelerometer is making measurements above a certain threshold, the client device may determine that the client device is moving, or the user is walking, running, etc. Combining these determinations, the client device may determine that the user is moving indoors or outside of a building.

Figure 3:
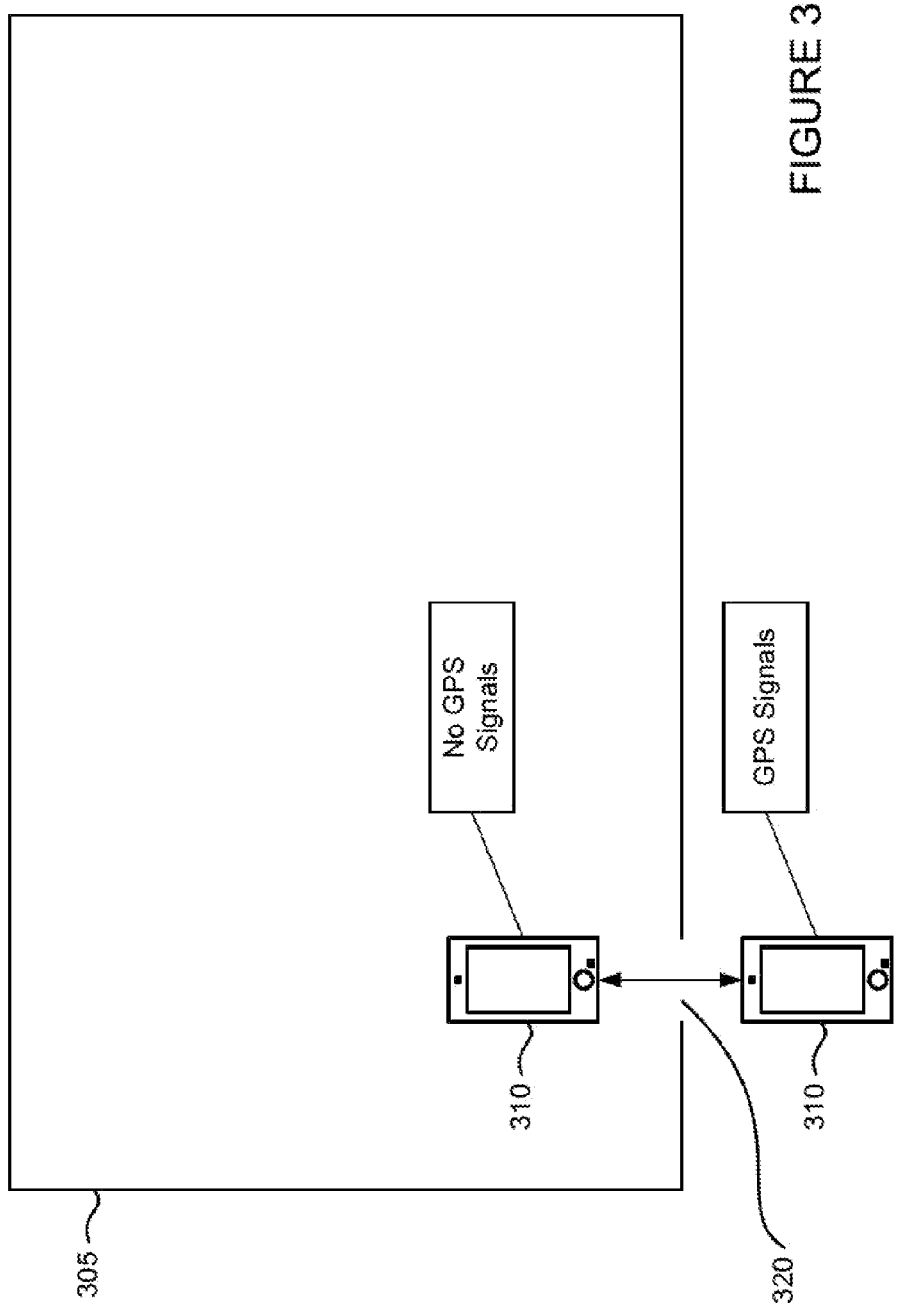
FIG. 3 is an exemplary building footprint in accordance with an exemplary embodiment.

Thus, when GPS signals are lost or become too weak or too few to accurately calculate a geographic location, the client device may determine that the user has entered a building. For example, as shown in FIG. 3, the client device 310 may enter a building defined by building footprint 305 through entrance 320. As shown in the figure, once client device 310 has entered, it may be unable to receive GPS signals.

In some examples, the client device may have access to building footprints, such as building footprint 305, which define an outer perimeter of a building. The client device may also be able to use the building footprint data to determine which entrance the user has used. This information may be used to increase the accuracy of the determination of whether the client device has entered a building. For example, if GPS signal reception is lost, but the last recorded GPS coordinate is not near a building footprint, the device may assume that the user is not indoors but just in an area where the GPS signals are weak.

Once the client device has determined that it (or the user) has entered a building, the client device may capture the GPS coordinate of the last location where the client device received GPS information. The client device may store this GPS coordinate in the memory of the client device.

While indoors, the client device may record a time-indexed log of orientation device measurements and wireless network information. For example, the log may include a timestamp, orientation and compass measurements, wireless network measurements, as well as other measurements such as Bluetooth, etc. if available. The wireless network measurements or "fingerprints" may include SSIDs or MAC addresses as well as the strength of the respective wireless network signals. Again, the wireless network measurements may include only information necessary to identify a wireless network access point and need not include any payload or personal data. For every unit of time along the track, the client device may record a wireless network fingerprint of that location. For example, a wireless network fingerprint may be recorded periodically, such as every 0.1 seconds. In order to reduce the amount of data recorded, for example, to save memory, processing, and, in some examples, transmission resources, this period may be extended. For example, if the period is doubled to 0.2 second, half as many data points will collected and stored.

Figure 4:
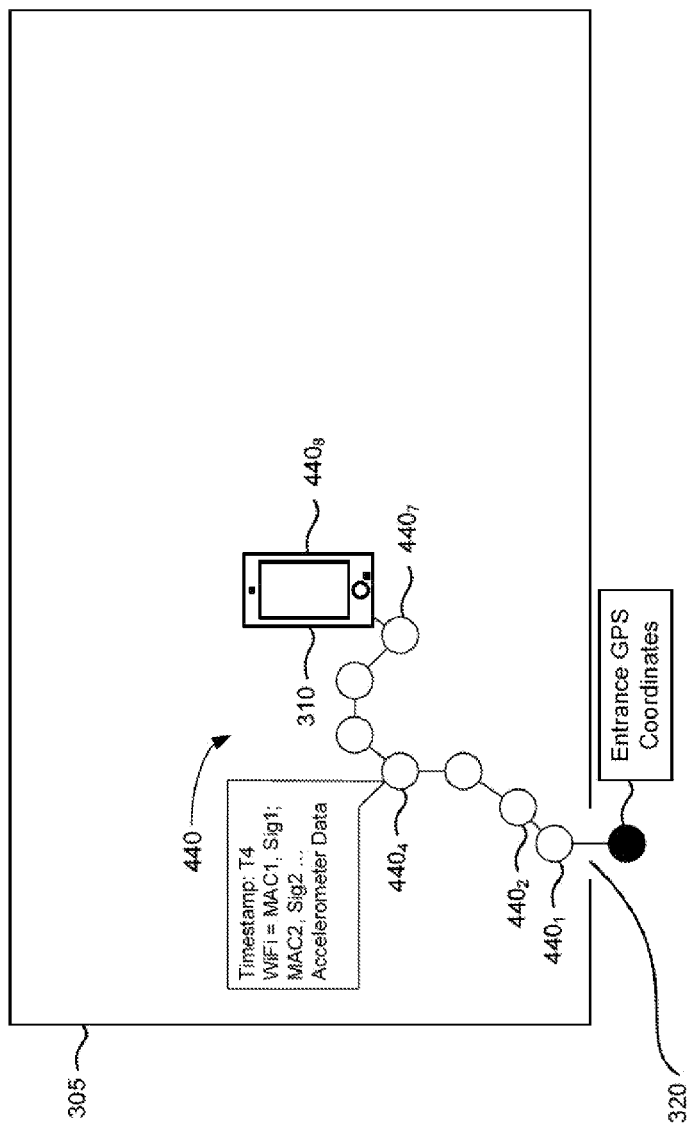
FIG. 4 is another exemplary building footprint in accordance with an exemplary embodiment.

As shown in FIG. 4, client device 310 has recorded a log including a plurality of data points 440, indicated by $440_1$ through $440_8$, at different locations within building footprint 305. Data point $440_4$ represents one such log entry including a timestamp, wireless network footprint, and accelerometer data.

It will be understood that the information collected by the client devices may be limited to the information discussed above (e.g. wireless access point identifiers such as SSIDs or MAC addresses and respective signal strengths) and need not contain additional information. For example, information contained in the network traffic, such as personal information, need not be collected, and in fact, may actually be removed in order to protect the privacy of the wireless network's users.

Figure 5:
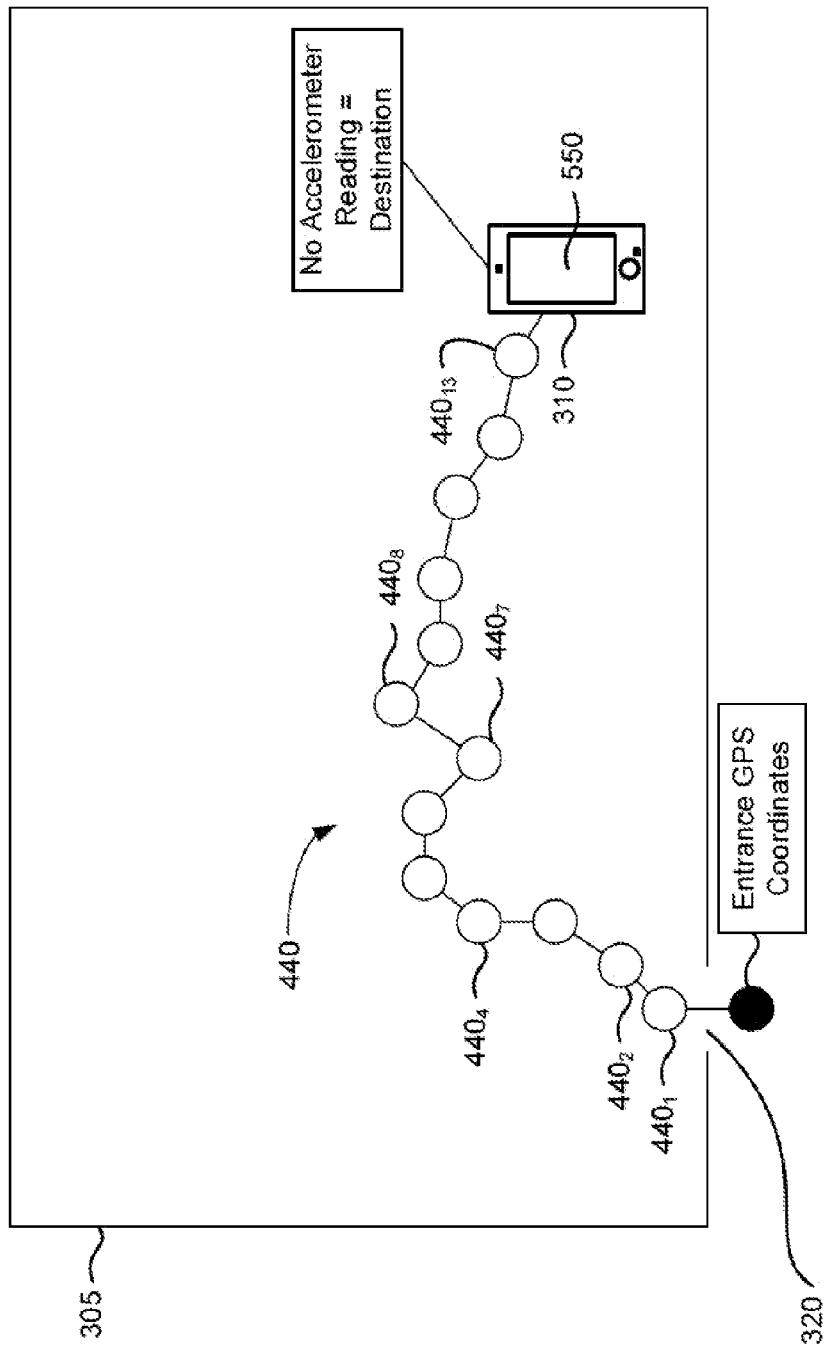
FIG. 5 is a further exemplary building footprint in accordance with an exemplary embodiment.

In some examples, the user may reach a destination within the building and stop moving. The client device may detect this based on a particular pattern of accelerometer data. For example, the client device may determine that it has stopped moving based on a lack of accelerometer information for some predefined period, such as 1 minute, or based on whether the accelerometer readings are below some threshold value. For example, as shown in FIG. 5, client device 310 has reached a destination 550 within building footprint 305. The client device has now recorded an additional 5 data points of data points 440 (data points $440_9$ through $440_{13}$). At destination 550, the accelerometer readings indicate that the user has stopped moving through the building (reached a destination).

Figure 6:
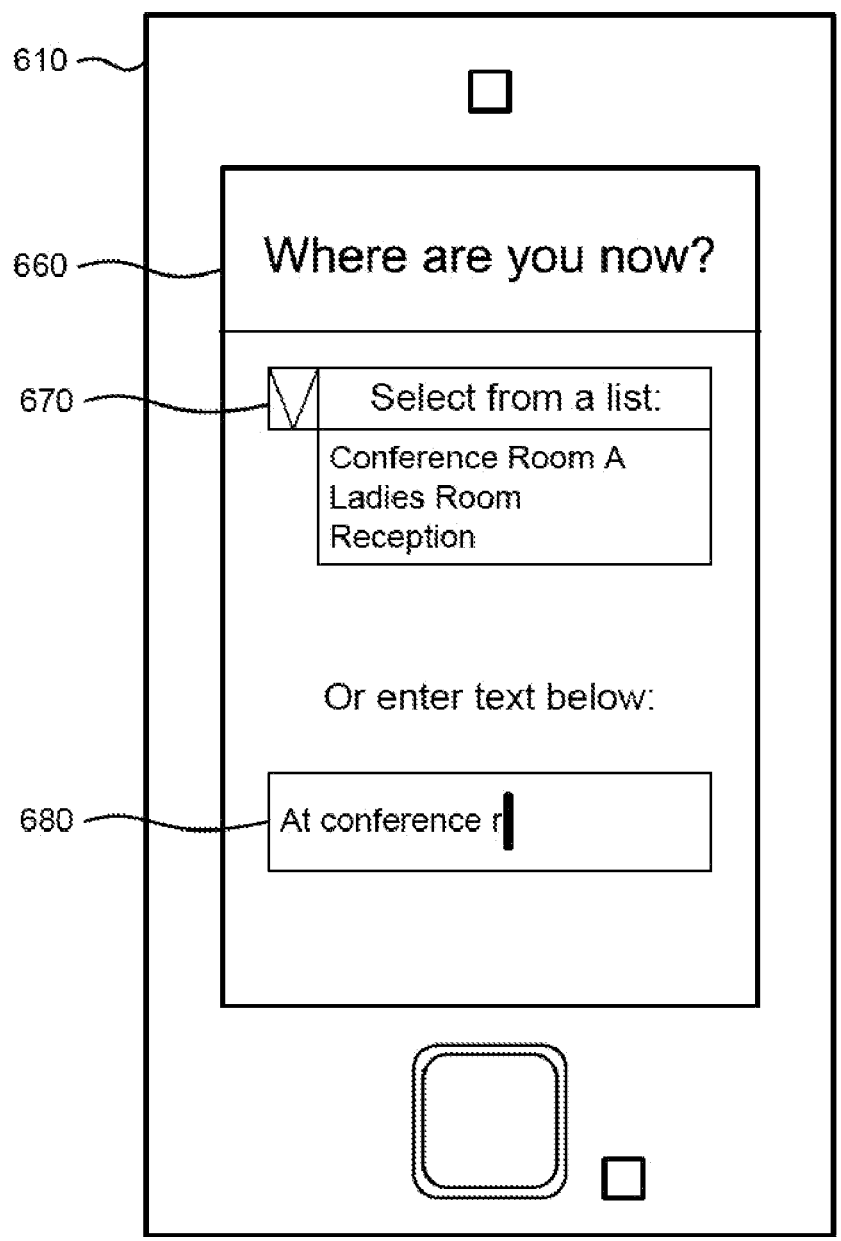
FIG. 6 is an exemplary client device and screenshot in accordance with an exemplary embodiment.

In response to reaching a destination, the client device may request information from the user. For example, the client device may prompt the user to provide some information about his or her current location. For example, the client device may display a message, such as a question or a request for information to the user. If the system has some idea of where the user may be, a pop up question may include, for example, "Are you in conference room <name>?" with options for the user to select "[YES]" or "[NO]" to answer the question. In another example shown in FIG. 6, the message 660 may be vaguer, such as "Please check in at your current location." The client device 610 may provide a drop-down menu 670 of options and/or a field 680 to enter the name of a destination or some other information about the destination.

If the user would like to participate, or rather respond to the prompt, the user may provide various types of information. For example, the user may provide a name for the current location, a picture, a list of amenities at the location (if available), a phone number, a destination type (office, restaurant, conference room, etc.), the size of the destination, etc.

In order to entice participation, the user may be provided with various incentives. For example, the various methods described in U.S. patent application Ser. No. 12/891,974, filed Sep. 28, 2010, entitled "SYSTEM AND METHOD OF FILLING IN GAPS IN IMAGE DATA" the entire disclosure of which is incorporated herein by reference, may be used in conjunction with the embodiments described herein.

Users may be required to take an affirmative step in order to select or "opt-in" to participate. For example, users may be required to sign in to a service before providing any information and may be provided with an explanation of how and why their feedback is being used. Similarly, users may be provided with the opportunity to cease participation temporarily or permanently at any time. By requiring users to opt-in and sign in for the service, this may also reduce the amount of third parties attempting to spam the system. Over time, the system may determine whether the data provided by some users' devices is consistently at odds with that of other users, and disregard the information provided by inconsistent devices.

When the user is asked to provide information ("user provided information") such as a destination name, various techniques may be used to try to convert the user's entry into a canonical representation or some unique way of identifying, spelling, or representing a location. For example, one user may provide "Leif Ericson Conference Room" while other users may provide "Leif Ericson," "Leif Ericson room," or "Leif Ericson GWC1" when referring to a room officially titled "Leif Ericson Conference Room GWC1-1". Thus, the canonical representations may be used to determine whether two different names are being used to identify the same location. The client device may also ask the user a follow-up question, such as "did you mean X?" if the client device is unable to automatically find a canonical representation.

In some examples, the location information requested from the user may be integrated with the user's calendar. For example, if the user is supposed to be at an appointment in a particular location at a particular time in the user's calendar, when the client device detects that the user has stopped moving, the calendar information may be used to generate specific questions for the user such as "Are you at Dr. Doe's Office?" or "are you in Suite 1 of Building 1?" Thus the user may "check-in" to a location, similar to various social networking applications. For example, to "check-in" at a particular location, the user may also be able to scan a (1D or 2D) bar code or even take a picture which may be matched to a database of already known locations.

The client device may record the destinations and the user information as a wireless network coordinate set (e.g. a timestamp, wireless network fingerprint, and user provided information).

Once the accelerometer (or other orientation) data indicates that the client device is moving again, the client device may continue to collect and record the log data described above.

Figure 7:
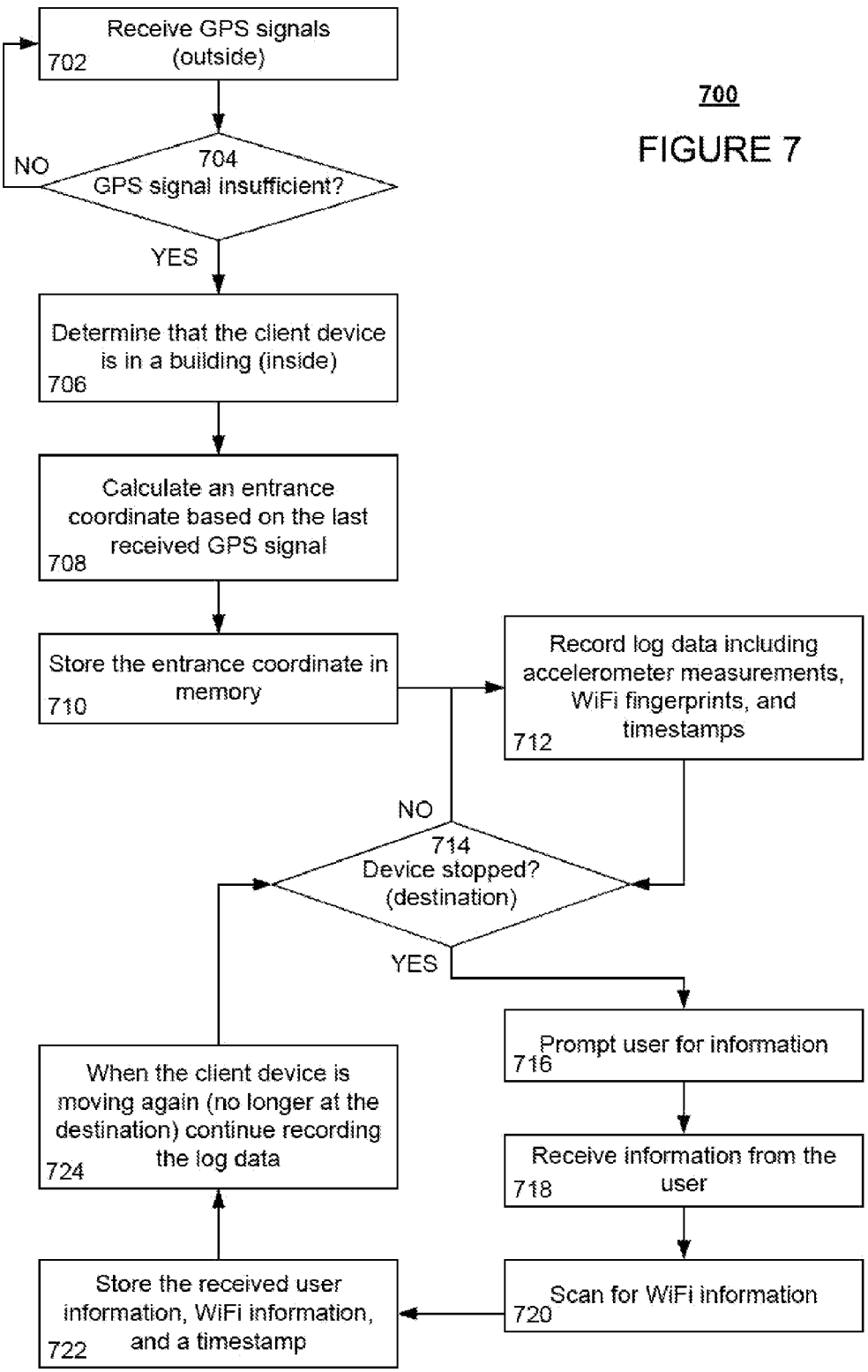
FIG. 7 is flow diagram in accordance with an exemplary embodiment.

For example, as shown in flow diagram 700 of FIG. 7, a client device that is outside receives GPS signals at block 702. At block 704, the client device determines whether GPS signals are insufficient to accurately determine position, for example if GPS signals are no longer being received, if the received signals are too weak, or if not enough different GPS signals are received to calculate a position are being received. If not, the client device may determine that it continues to be located outside and will continue to receive GPS signals at block 702. If the client device is no longer receiving sufficient GPS signals, it will determine that it is indoors or inside of a building (or other structure such as a tunnel) at block 706. The client device calculates an entrance coordinate based on the last received GPS signals at block 708. The entrance coordinate is stored in memory at block 710.

Once indoors, at block 712, the client device may record log data including accelerometer measurements, wireless network fingerprints, and timestamps which the client device is being moved through the building. If the client device determines, for example based on the accelerometer information, that the client device is no longer moving at block 714, the client device may determine that the user has reached a destination or waypoint within the building. At block 716, the client device may prompt the user for information about the destination. For example, the client device may request that the user identify the destination (or waypoint). At block 718, the client device receives information from the user about the destination. The client device also scans for wireless network information (to generate another fingerprint) at block 720. The information received from the user, the wireless network information, and a new timestamp are stored in memory at block 720. When the client device begins moving through the building again, for example based on the accelerometer information, the client device may determine that is no longer at the destination. Thus, at block 724, the client device may continue to record the log data, returning to block 714 to determine whether the client device has reached another destination as described above.

Figure 8:
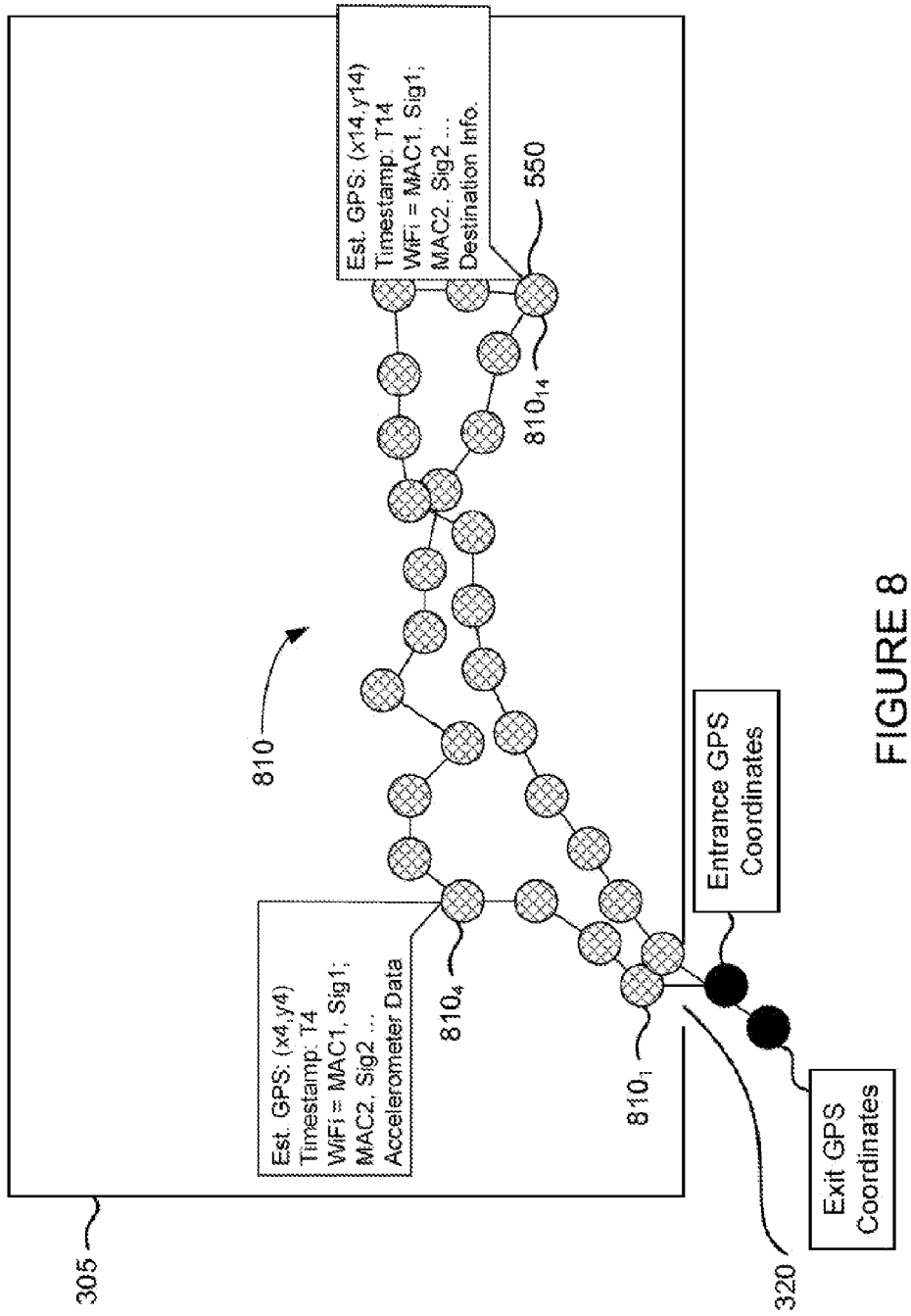
FIG. 8 is an additional exemplary building footprint in accordance with an exemplary embodiment.

This process may continue until the user exits the building. Once the user exits a building, the client device may determine a new GPS location as GPS signals are received again. Again, the client device may record the coordinates of the new GPS location as an exit location. Thus, the client device has stored an entrance GPS coordinate, an exit GPS coordinate, a series of coordinate sets including timestamps and wireless network fingerprints along the route taken by the client device, and in some examples one or more destinations including timestamps, wireless network fingerprints, and user information as described above. As shown in FIG. 8, the client device may use this data to identify a track 810 or set of estimated GPS coordinates along the route taken by the client device between the entrance and exit points. For example, data point $810_4$ is associated with an estimated GPS coordinates, a timestamp, a wireless network fingerprint, and accelerometer data. Data point $810_{14}$, associated with destination 550, is associated with another estimated GPS coordinates, another timestamp, another wireless network fingerprint, and the destination information inputted by the user (see FIG. 6).

The track may be calculated by using a dead-reckoning method utilizing the accelerometer as a pedometer. For example, using the accelerometer measurements, one may determine approximately how fast and in what direction the user is moving along a track, as a pedometer. In some examples, compass measurements may also be used; however, it will be understood that while indoors and proximate to metal filing cabinets and electronic devices, some compasses may be less reliable. Using this method, the accelerometer data may be used in conjunction with the start and end point data to approximate GPS coordinates for each wireless network fingerprint recorded along the route taken by the client device. This calculation may be performed while the device is moving along the track. Alternatively, the track data may be uploaded as it is recorded or the "completed" track data may be uploaded to a server which may allow for more complex processing than many mobile devices, for example to perform two-way optimization using the Google pose optimizer. In some examples, the data may be uploaded only when requested by the user or when the client device is connected to a particular mobile or wireless network or where the client device has access to a network which meets some minimum bandwidth requirement. Thus, client device or the server may approximate the GPS coordinates of one or more destinations associated with user provided information.

After a client device has recorded an entrance GPS coordinate, an exit GPS coordinate, a track, and one or more destinations, it may be transmitted to a server computer. The server may receive the crowd-sourced information and conduct further processing. For example, the server may be able to aggregate or average out all the tracks and create a high quality set of possible routes into and within a building. In addition, the entrance and exit GPS location coordinates may be used to identify the approximate entrances and exits of buildings. This information may be sent to a server, or simply stored at the client device, in order to annotate the building footprint data with entrance and exit information as described above.

In some examples, techniques used to create maps that average large quantities of GPS tracks uploaded by users may be used to generate these routes. For example, all of the tracks computed for users who entered a building at a particular point (where GPS signal was lost) and went to a particular room (as identified by the user), may be examined by running a clustering algorithm to decide which sets of tracks are most similar to each other. These tracks may be considered to be of higher quality. For example, there may be multiple routes to a particular destination. These computations may be used to weed out "outliers" (or inconsistent tracks) and identify the most consistent and highest quality sets of tracks.

For example, there may be a plurality of tracks which extend between locations A and B, both known locations. In one example, location A may be an entrance to a building and location B a particular conference room within the building. There may also be a number of good possible paths from A to B, for example paths which actually define locations where users are likely to walk. In order to identify these good paths, similar tracks which likely represent the same possible path from A to B may be clustered together. These clusters may be used to identify the best path for each particular cluster.

In one approach, there may be N number of tracks between A and B. Not all of these tracks are of the same length. For each unit of distance D, for example every meter, between 1 and the maximum length of these tracks, consider the number of points P which are a distance D from A. For all of these points that are within some maximum deviation, for example 1 meter, the respective tracks may be considered equivalent or may be clustered together. These clustered tracks may be used to identify the good tracks, for example, a good track is likely to pass through the center of mass of each of the N tracks which is within the maximum deviation.

If none of the tracks are within the maximum deviation, other clustering methods, such as k-means, may be used. This clustering process may be repeated until all of the tracks have been analyzed and there remains only 1 or 2 or perhaps 3 clusters. Each of these remaining clusters may represent one good possible path from A to B.

In some examples, a "preferred" path may be identified from the remaining few clusters. For example, the cluster associated with the largest number of tracks out of the N original tracks may be identified as the preferred path between location A and B. This "preferred" path may be used if a user requests directions between two locations, such as locations A and B or directions between two locations along the preferred path.

By aggregating data over a plurality of users (or user devices) the system may be able to generate representations of buildings, rooms, etc. For example, the remaining few clusters or tracks may be drawn on a map to create a skeleton of walkable paths within the indoor space. In some examples, further clustering may be required to increase the accuracy of the defined spaces. With a sufficiently large amount of high quality clusters or tracks, containment relationships between buildings and rooms may be derived.

For example, the server may receive sets of tracks from door 1 to conference room A as well as tracks from door 2 to conference room A. Using the doors and conference room as reference points, the server may refine the scale of the tracks. For example, when using an accelerometer (and possibly a gyroscope, compass, or other sensors) as a pedometer, it may be difficult to estimate how far the user is moving. Some individuals may have shorter steps, and other longer. Thus, the accelerometer measurements may allow for the identification of the shape of a path, but not the right scale or length. As different users may have identified the same destination as "conference room A," all of their tracks may be assumed to end up roughly at the same location (conference room A). This information may then be used to stretch or scale the computed tracks in order to satisfy this constraint.

For example, if users X and Y both generate tracks between door N and conference room A, their respective client devices will record a plurality of data along the way. This data may be used to estimate their relative step size. For example, A may have a stride which is 1.15 times longer than Y. If tracks are observed from either user A or user Y between door N and conference room A and between door S and conference room A, these paths may be normalized with respect to each other, for example, to make them all relative to X's step size. A scale factor may be computed to ensure that all tracks from N to A and from S to actually line up with the same locations (all N, all S, all A, etc.) This will provide an estimate of the step size of user X as well as user Y.

In addition, various global optimizations running over all neighboring tracks should also be possible. For example, optimization techniques such as (or similar to) constraint programming may be used. For example, if tracks have been collected from M users from various doors to a plurality of locations L within the same building. The locations and step size of each individual are initially unknown. Various constraints or initial assumptions may be provided by the tracks or predefined, such as the assumption that individual footsteps do not vary over time or vary little within a specified range over time. Optimization techniques may allow for the extraction of all M step sizes and P locations such that the constraints are best satisfied.

Once the server has identified a set of high quality tracks associated with a particular building, the server may examine the wireless network fingerprints collected along the associated routes. For example, the server may identify a plurality of tracks for which there is an accurate starting point (the entrance); an accurate end point (the exit); the name or some other detail about one or more destinations between these locations (the destination information); and wireless network fingerprints and accelerometer data taken along a route connecting these locations. Taking the wireless network fingerprint into account over parts of the tracks (for example, 5-10 meter sections of a route between two known locations, the server may determine which tracks or portions of tracks are in fact at the same location and create new constraints.

For example, the same wireless network fingerprints (within some tolerance) may be observed along two separate tracks between the same locations at coordinates (x1,y1) on a first track and (x2,y2) on a second track. These two coordinate locations may be assumed to be the same (or very close to the same) location (again within some tolerance). This information may be used to generate a new constraint which may be used as part of a global optimization aimed at solving for good possible paths or the most plausible set of tracks given the observed measurements.

Considering these constraints together, the server may run an optimization algorithm similar to a "loop closing" method to refine the positions of a set of tracks. For example in typical loop closing, the server may determine that point X on track A is in fact the same as point Y in track B because corresponding wireless network fingerprints match, where track A and track B include similar entrance, exit and/or destination locations. The result of these determinations may be globally consistent set of refined possible tracks through a building.

Figure 9:
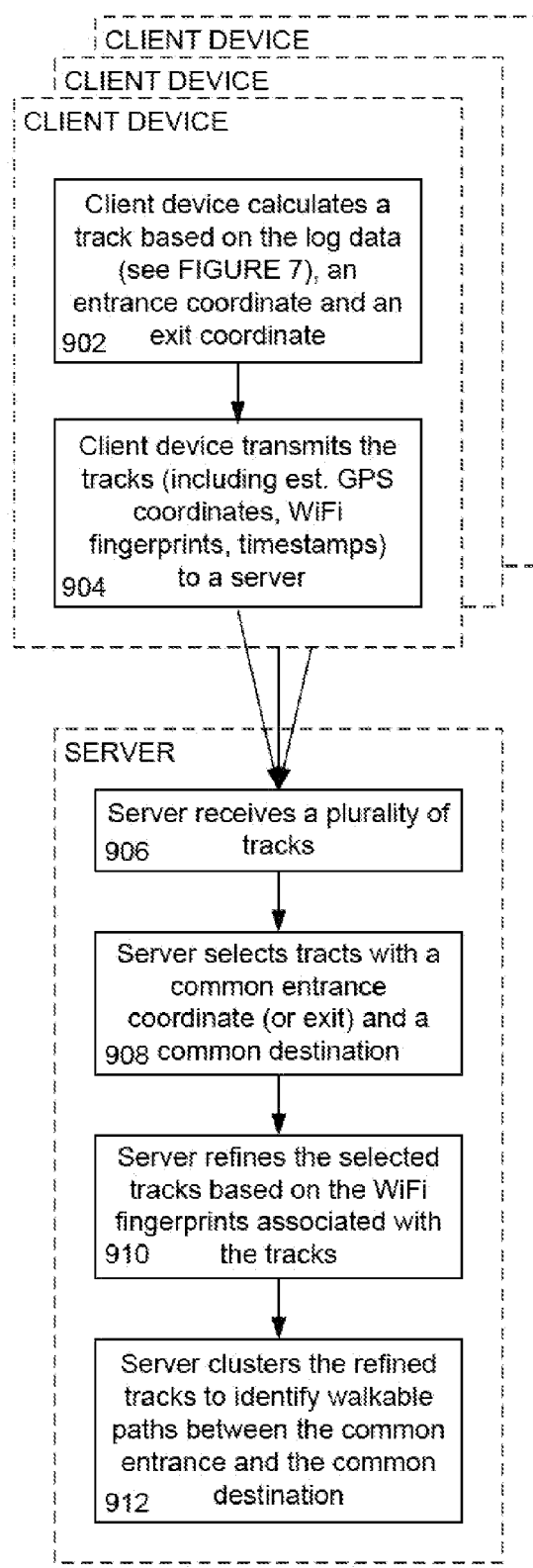
FIG. 9 is flow diagram in accordance with an exemplary embodiment.

For example, as shown in flow diagram 900 of FIG. 9, a client device calculates a track based on the log data (timestamps, wireless network fingerprints, and accelerometer measurements), an entrance coordinate, and an exit coordinate at block 902. The tracks include estimated GPS coordinates for each of the locations of the log data, wireless network fingerprints, and timestamps. The client device then transmits the track to a server at block 904.

At block 906, the server receives a plurality of tracks from a plurality of client devices. The server then selects tracks with a common entrance or exit coordinate and a common destination within the building at block 908. The server refines the selected tracks based on the wireless network fingerprints associated with the tracks at block 910, for example, by identifying the same coordinates between different tracks based on common wireless network fingerprints. The server then clusters the refined tracks together, as described above, to identify one or more walkable paths between the common coordinate and the destination within the building at block 912.

This refined set of possible tracks and the through a building, the destinations in the building, as well as the high quality wireless network surveying may be used to route people through the building to the destinations. For example, this information may be helpful to identify walkable paths indoors from an entrance to a destination (or from a destination to an exit). Thus, when a user requests a route which requires some portion of indoor navigation, such as, "how to I go from my house to a Store A in a mall?," the track and destination information may be used to generate a route. In other words, on a map, building and interior spaces need not be represented as a traditional floor plan, but very much like an outdoor map, with POIs (points of interests, such as a particular store or conference room) and paths between these POIs. This allows for routing between locations within a building without the need for building floor plans.

Figure 10:
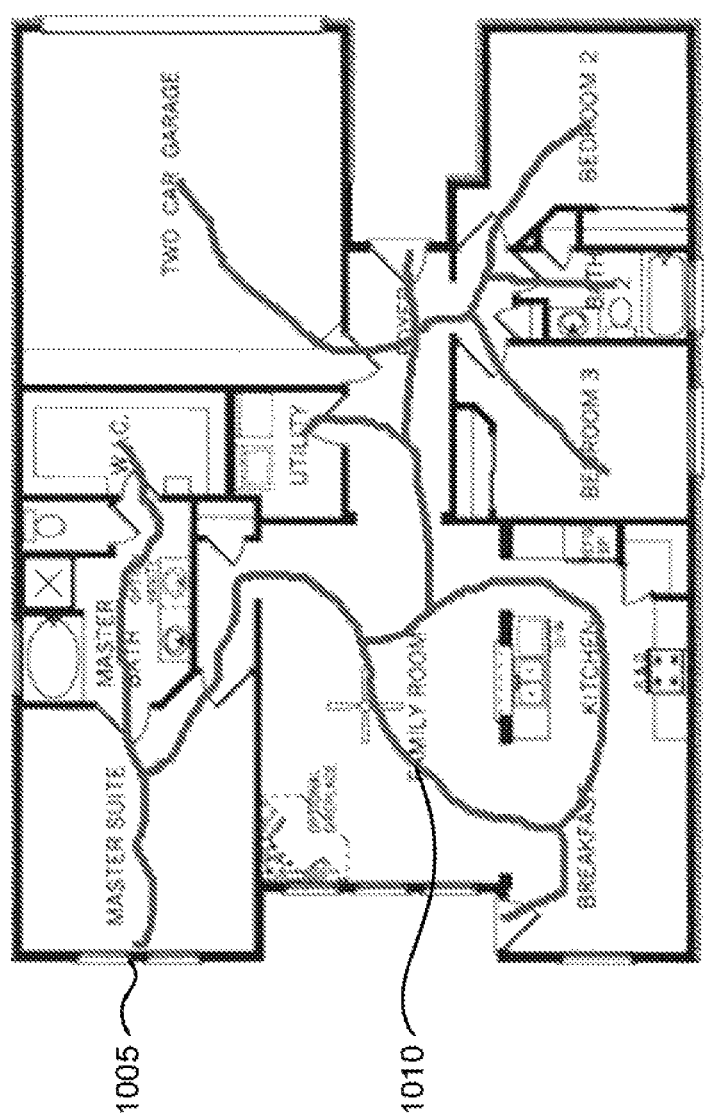
FIG. 10 is an exemplary graph representation in accordance with an exemplary embodiment.

In some examples, the set of possible tracks may be represented as a graph. For example, as shown in FIG. 10, the lines 1010 though structure 1005, may represent the topology or rather the connectivity between spaces and not necessarily the exact physical location of the walkable paths between rooms. This graph may then be used to route users though the indoor space.

Although FIG. 10 depicts a relatively small domestic space, it will be understood that aspects of the disclosure may be utilized in conjunction with fairly large spaces, including commercial spaces such as office buildings, malls, airports, etc.

This approach may also allow the server to derive, even without all of the processing described above, a wireless network fingerprint of all of the destinations (or points of interest ("POI") in a given building. For example, in an office building, this approach may be employed to identify the wireless network fingerprint of all conference rooms. This may be used for example, to automatically update people's "status messages" on location and networking applications such as gmail, facebook, foursquare, etc.

In one example, the destinations may be recorded as a set of possible coordinates which may be merged into a "blob" or polygon describing the destination. If the calculations are accurate within a small distance, for example 3 to 5 meters, a single (x,y) coordinate may be sufficient to represent a small room. However, for a larger room, a polygonal representation may be more practical. For example, for a particular business, such as a café or restaurant, a single wireless network fingerprint may be insufficient. These larger estimations may be represented as a number of (x,y) coordinates, each with a respective wireless network signature. These sets of points may be grouped together to represent a location. Thus, it may be more practical to represent the location as a blob or polygon rather than a particular coordinate set.

For the purposes of simplicity, the examples herein are directed to single story buildings. However, it will be understood that the systems and methods described herein may be utilized in conjunction with multi-story buildings. For example, wireless network access points on different floors may be used to determine on which floor the device is located.

In addition, while the examples herein are presented utilizing wireless network fingerprints, other signals may also be used. Ultrasound, Ultra-Wide Band (UWB), Bluetooth, and other signals may be recorded as a particular fingerprint or included in a wireless network fingerprint. For example, UWB is a technology that may be well suited for doing indoor localization but is presently not widely deployed. As use of UWB hardware increases, for example, if this technology becomes less expensive and more widespread, it will be understood that UWB signals and signal strengths alone or in combination with wireless network signals and signal strengths. As long as there some beacon messages in a building, and the client device is able to receive and identify relevant data (typically an identifier and associated signal strength) from these beacons.

As these and other variations and combinations of the features discussed above can be utilized without departing from the subject matter defined by the claims, the foregoing description of exemplary embodiments should be taken by way of illustration rather than by way of limitation of the subject matter defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method comprising:
   determining, by a processor, that a GPS signal is insufficient to accurately determine position based on a characteristic of the GPS signal;
   identifying an entrance location of a building based on a GPS coordinate identified before determining that the GPS signal is insufficient;
   after the GPS signal is determined to be insufficient, recording a set of route data including a timestamp, accelerometer data, and a wireless network signal fingerprint comprising one or more wireless network signal beacon identifiers and associated signal strengths;
   identifying an exit location of the building based on a GPS coordinate determined after the processor is able to accurately determine position based on GPS signals;
   storing the entrance location, the exit location, and the route data in memory accessible by the client device;
   generating, by the processor, a track including a set of location coordinates based on the route data, the entrance location, and the exit location; and
   transmitting the track to a server.

2. The method of claim 1, further comprising:
   determining when the client device has stopped moving based on the accelerometer data;
   when the client device has stopped, presenting to a user a request for information regarding a current location of the client device;
   receiving information identifying the current location of the client device; and
   storing the received information as a destination.

3. The method of claim 2, further comprising:
   identifying location coordinates associated with the destination based on the entrance location, exit location, and route data; and
   transmitting the location coordinates associated with the destination and the destination to the server.

4. The method of claim 1, further comprising:
   identifying a particular building associated with the entrance location and the exit location based on a map of building footprint data;
   associating the particular building with the route; and
   transmitting the particular building associated with the route to the server.

5. The method of claim 1, wherein the signal beacon identifiers include wireless network access point identifiers.

6. A method comprising:
   identifying a plurality of tracks, each track including (a) an entrance location of a particular building based on a last set of GPS signals determined by a given client device before the given client device determines that a GPS signal is insufficient to accurately determine position based on a characteristic of the GPS signal, (b) a set of intermediate locations, each intermediate location being associated with an estimated geolocation coordinate a wireless network signal fingerprint comprising wireless network signal beacon identifiers and associated signal strengths, the set of intermediate locations being recorded after the GPS signal has been determined to be insufficient, (c) destination data including information about the destination received from a user, a destination wireless network signal fingerprint, and an estimated geolocation coordinate for the destination, and (d) an exit location of the particular building determined based on GPS signals received by the client device after the client device is able to accurately determine position based on the received GPS signals;
   selecting a subset of the plurality of tracks having a common entrance location and a common estimated geolocation coordinate for a particular destination associated with an interior of the particular building;
   refining the subset of tracks based on the wireless network signal fingerprints associated with the set of intermediate locations associated with each track of the subset of tracks; and identifying one or more walkable paths through the particular building based on the refined subset of tracks.

7. The method of claim 6, further comprising:
receiving, from a particular client device, a request for directions to the particular destination;
generating a set of instructions for navigating to the destination based on the identified one or more walkable paths; and
transmitting the set of instructions to the particular client device.

8. The method of claim 6, wherein the refining is based on clustering the tracks of the subset of tracks.

9. The method of claim 6, further comprising receiving the plurality of tracks from a plurality of client devices.

10. The method of claim 6, further comprising:
receiving, from a plurality of client devices, a received plurality of routes including (a) an entrance location of the particular building based on the last GPS signals determined by a given one of the plurality of client device before the given client device determines that a GPS signal is insufficient to accurately determine position based on a characteristic of the GPS signal, (b) a received set of intermediate locations, each intermediate location being associated with accelerometer data, a wireless networksignal fingerprint, and a time stamp, (c) received destination data including the information about the destination received from a user, a destination wireless networksignal fingerprint, and a timestamp, and (d) an exit location of the particular building determined based on GPS signals received by the given client device after the given client device is able to accurately determine position based on the received GPS signals; and
generating, by the processor, the estimated geolocation coordinates for each of the intermediate locations and the estimated geolocation coordinate for the destination, based on the received plurality of routes; and
wherein the plurality of tracks are identified based on the received plurality of routes, the estimated geolocation coordinates for each of the intermediate locations and the estimated geolocation coordinate for the destination.

11. The method of claim 6, further comprising:
selecting a particular walkable path of the one or more identified walkable paths based on the number of the subset of tracks which correspond to the particular walkable path;
storing the particular walkable path;
receiving, from a particular client device, a request for directions to the particular destination;
generating a set of instructions for navigating to the destination based on the particular walkable paths; and
transmitting the set of instructions to the particular client device.

12. The method of claim 6, wherein the signal beacon identifiers include wireless network access point identifiers.

13. A device comprising:
memory;
a processor to:
determine that a GPS signal is insufficient to accurately determine position based on a characteristic of the GPS signal;
identify an entrance location of a building based on a GPS coordinate identified before determining that the GPS signal is insufficient;
after the GPS signal is determined to be insufficient, record a set of route data including a timestamp, accelerometer data, and a wireless network signal fingerprint comprising one or more wireless network signal beacon identifiers and associated signal strengths;
identify an exit location of the building based on a GPS coordinate determined after the processor is able to accurately determine position based on GPS signals;
store the entrance location, the exit location, and the route data in the memory;
generate a track including a set of location coordinates based on the route data, the entrance location, and the exit location; and
transmit the track to a server.

14. The device of claim 13, wherein the processor further:
determines when the client device has stopped moving based on the accelerometer data;
when the client device has stopped, presents to a user a request for information regarding a current location of the client device;
receives information identifying the current location of the client device; and
stores the received information as a destination.

15. The device of claim 14, wherein the processor further:
identifies location coordinates associated with the destination based on the entrance location, exit location, and route data; and
transmits the location coordinates associated with the destination and the destination to the server.

16. The device of claim 13, wherein the processor further:
identifies a particular building associated with the entrance location and the exit location based on a map of building footprint data;
associates the particular building with the route; and
transmits the particular building associated with the route to the server.

17. The device of claim 16, wherein the processor also:
receives, from a particular client device, a request for directions to the particular destination;
generates a set of instructions for navigating to the destination based on the identified one or more walkable paths; and
transmits the set of instructions to the particular client device.

18. The device of claim 16, wherein the processor refines by clustering the tracks of the subset of tracks.

19. The device of claim 16, wherein the processor further receives the plurality of tracks from a plurality of client devices.

20. The device of claim 16, wherein the processor further:
selects a particular walkable path of the one or more identified walkable paths based on the number of the subset of tracks which correspond to the particular walkable path;
stores the particular walkable path in the memory;
receives, from a particular client device, a request for directions to the particular destination;
generates a set of instructions for navigating to the destination based on the particular walkable paths; and
transmits the set of instructions to the particular client device.

21. A device comprising:
memory; and
a processor to:
identify a plurality of tracks, each track including (a) an entrance location of a particular building based on a last set of GPS signals determined by a given client device before the given client device determines that a GPS signal is insufficient to accurately determine position based on a characteristic of the GPS signal, (b) a set of intermediate locations, each intermediate location being associated with an estimated geolocation coordinate a wireless network signal fingerprint comprising wireless network signal beacon identifiers and associated signal strengths, the set of intermediate locations being recorded after the GPS signal has been determined to be insufficient, (c) destination data including information about the destination received from a user, a destination wireless network signal fingerprint, and an estimated geolocation coordinate for the destination, and (d) an exit location of the particular building determined based on GPS signals received by the client device after the client device is able to accurately determine position based on the received GPS signals;

select a subset of the plurality of tracks having a common entrance location and a common estimated geolocation coordinate for a particular destination associated with an interior of the particular building;

refine the subset of tracks based on the wireless network signal fingerprints associated with the set of intermediate locations associated with each track of the subset of tracks;

identify one or more walkable paths through the particular building based on the refined subset of tracks; and store the one or more walkable paths in the memory.

* * * * *